United States Patent [19]

Chierici et al.

[11] 4,248,158
[45] Feb. 3, 1981

[54] RAILWAY HOPPER CAR GATE OUTLET ACTUATING MECHANISM

[75] Inventors: Osvaldo F. Chierici, Geneva; Richard F. Murphy, Batavia, both of Ill.

[73] Assignee: Holland Company

[21] Appl. No.: 38,809

[22] Filed: May 14, 1979

[51] Int. Cl.³ .................... B61D 7/20; B61D 7/22; B61D 7/26; F16C 29/00

[52] U.S. Cl. .................... 105/282 R; 49/428; 105/299; 105/304; 222/512; 308/3.6

[58] Field of Search .......... 105/282 A, 282 P, 282 R, 105/299, 304; 222/505, 512, 561; 308/3.6, 3.8; 312/294, 295, 350; 49/428

[56] References Cited

U.S. PATENT DOCUMENTS

| | | | |
|---|---|---|---|
| 472,003 | 3/1892 | Snyder et al. | 105/282 R |
| 2,989,931 | 6/1961 | Juy | 105/282 P |
| 3,127,852 | 4/1964 | Beauchamp | 105/282 P X |
| 3,635,170 | 1/1972 | Chierici | 105/282 R |
| 4,006,692 | 2/1977 | Chierici | 105/282 P |

*Primary Examiner*—Howard Beltran
*Attorney, Agent, or Firm*—McWilliams, Mann & Zummer

[57] ABSTRACT

An outlet assembly for application to hoppers of railroad hopper cars and the like, and slidably mounting a gate for movement between open and closed positions, in which the gate slideway is defined by trackway forming members disposed at either side edge of and across the mid portion of the gate outlet port, and having the respective load supporting surfaces each lined with a special liner formed from an ultra high molecular weight polymeric material that is of dry self lubricating characteristics. The gate side edges ride on the liners of the track forming members at the respective side edges of the outlet port, and the respective gate side edges and the liners supporting same cooperate to effect a bulk material seal at the respective side edges of the gate. The liner across the mid portion of the outlet assembly outlet port is mounted for limited lost motion movement relative to the gate and cooperates with a stop forming abutment to provide a gate break away action when the gate is opened under loaded conditions.

14 Claims, 6 Drawing Figures

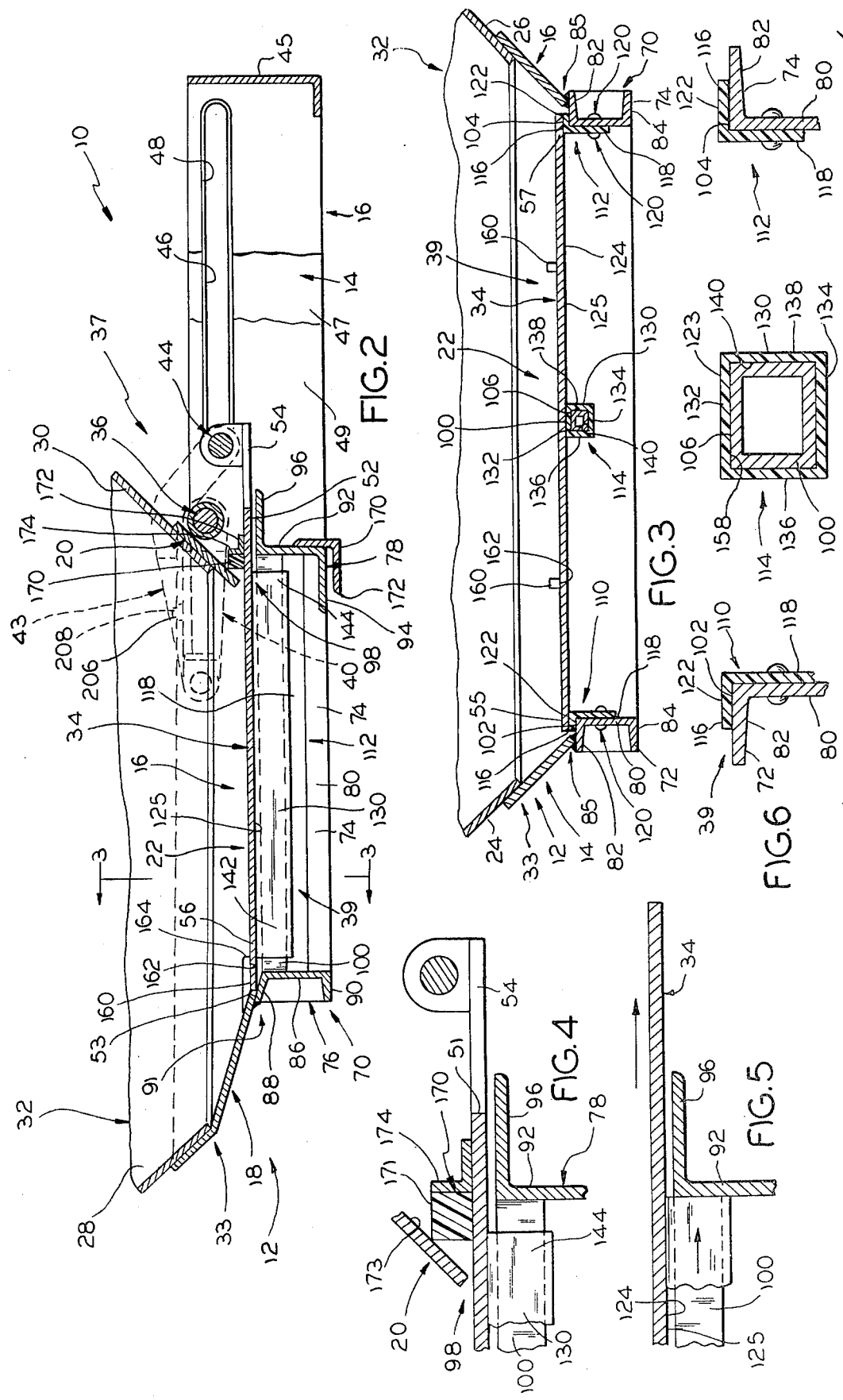

RAILWAY HOPPER CAR GATE OUTLET ACTUATING MECHANISM

This invention relates to outlet gate assemblies for hoppers of railroad hopper cars and the like, and more particularly, to a gate support arrangement therefor.

Conventional hopper car outlet gate arrangements are available in a number of forms, but are generally arranged to define a continuation of the car hopper sheeting that narrows or funnels down to the outlet port itself, and to provide a door plate or gate that moves between open and closed positions to open and close the outlet of the hopper. The door plate or gate itself in equipment of this type has ordinaly been formed from metal, usually steel. It is therefore relatively heavy, and as the trackway the gate rides on is also usually formed from steel, the power requirements conventionally required to move the gate of the hopper car when loaded from closed to opened position are substantial.

Furthermore, some bulk materials, such as potash, tend to stick or adhere to the door plate and the components of the outlet gate assembly relied upon to seal the gate, making it difficult to effectively seal the door plate when the hopper is loaded. Effective sealing in this area is, of course, required to avoid loss of the bulk material during transit and contamination of the bulk material remaining in and around the door plate due to the admittance of foreign matter through interruptions in the seal about the gate.

The principal object of this invention is to provide an outlet gate arrangement for railroad hopper cars in which the gate slideway is defined by trackway forming surfacing provided by load supporting frame members equipped with liner elements formed from an ultra high molecular weight polymeric material of special characteristics that serve the function of both slidably mounting the gate for opening the gate under loaded conditions with minimized power requirements, and providing effective bulk material seals along the side edges of the gate.

Another principal object of the invention is to provide an outlet gate arrangement for railroad hopper cars in which the gate is equipped to have a special breakaway action when it is to be moved to its open position under loaded conditions.

Another important object of the invention is to provide a hopper car outlet gate arrangement of simplified nature that avoids the need for special top seal arrangements.

Other objects of the invention are to provide an outlet gate assembly that has quick opening characteristics, and that is economical of manufacture, convenient to install and use, and long lived in operation.

In accordance with the invention, the outlet assembly comprises a frame made up of spaced pairs of longitudinal and transverse main frame members joined together and shaped to define a continuation of the hopper car sheets. The assembly defines the outlet opening and includes a slideway for the gate, on which the gate is mounted, in the form of a pair of spaced apart parallel elongate side trackway members disposed on either side of the gate slideway to support the side edges of the gate, and a third trackway member positioned across the outlet port intermediate and parallel to the side trackway members. These trackway members each define upwardly facing load support surface.

The side trackway members each have applied to their respective load support surfaces a liner formed from a polymer material of special characteristics that extends along the side trackway members and is interposed between the gate underside and the respective side trackway member load support surfaces, so that at the gate side edges, the gate rides on the indicated liners.

The trackway member across the mid portion of the assembly outlet port has a liner applied to its load support surface that is formed from the same material; this liner is mounted for limited lost motion movement relative to the gate and to the assembly funneling portion involved, and cooperates with an assembly frame member that serves as a stop for limiting the lost motion movement involved in this liner to provide a breakaway action for the gate when the gate is to be opened under loaded conditions.

The material from which the slideway support surface liners is formed is an ultra high molecular weight polyethylene characterized by a high degree of elastic memory and having surfacing that resists adherence thereto of foreign matter including bulk materials, such as potash, that are encountered in the use of hopper cars.

The outlet assembly is equipped for effective sealing at the gate front end rear edges when the gate is in closed position, and the trackway member liners of the trackway side forming materials cooperate with the underside of the gate to provide effective seals along the side edges of the gate without any other sealing action being required in these areas of the assembly.

The liner of the trackway forming member that lies across the mid portion of the outlet opening is of the sleeve type and has slidably mounted on such frame member to have limited movement longitudinally of the slideway that is stopped by the frame member that underlies the gate adjacent its rear edge when the gate is in its closed position.

When the gate is in its closed position and the hopper is loaded, the weight of the lading on the hopper presses the gate against the liners underlying the gate side edges for effecting the indicated seal at these locations of the gate. The gate front and rear portions make sealing engagement with the hopper funneling portion to provide effective seals at the front and rear of the gate.

When the gate is to be opened, the initial opening movement of the gate first moves the gate and center trackway member liner as a unit due to the static friction between the gate and the indicated liner, through the lost motion movement of the indicated liner that is available, and when this lost motion movement is stopped, the gate breaks away from the liner and continues its opening movement toward the open position.

Other objects, uses and advantages will be obvious or become apparent from a consideration of the following detailed description and the application drawings in which like parts are indicated by like reference numerals throughout the several views.

In the drawings:

FIG. 2 is a vertical sectional view taken substantially along line 2—2 of FIG. 1, showing the gate in its closed position;

FIG. 3 is a vertical sectional view taken substantially along line 3—3 of FIG. 2;

FIGS. 4 and 5 are fragmental vertical sectional views similar to FIG. 2 illustrating the nature of the breakaway action of the gate arrangement of this invention; and FIG. 6 is an enlarged view of the gate supporting slideway sectioned vertically as in FIG. 3.

Figure 1:
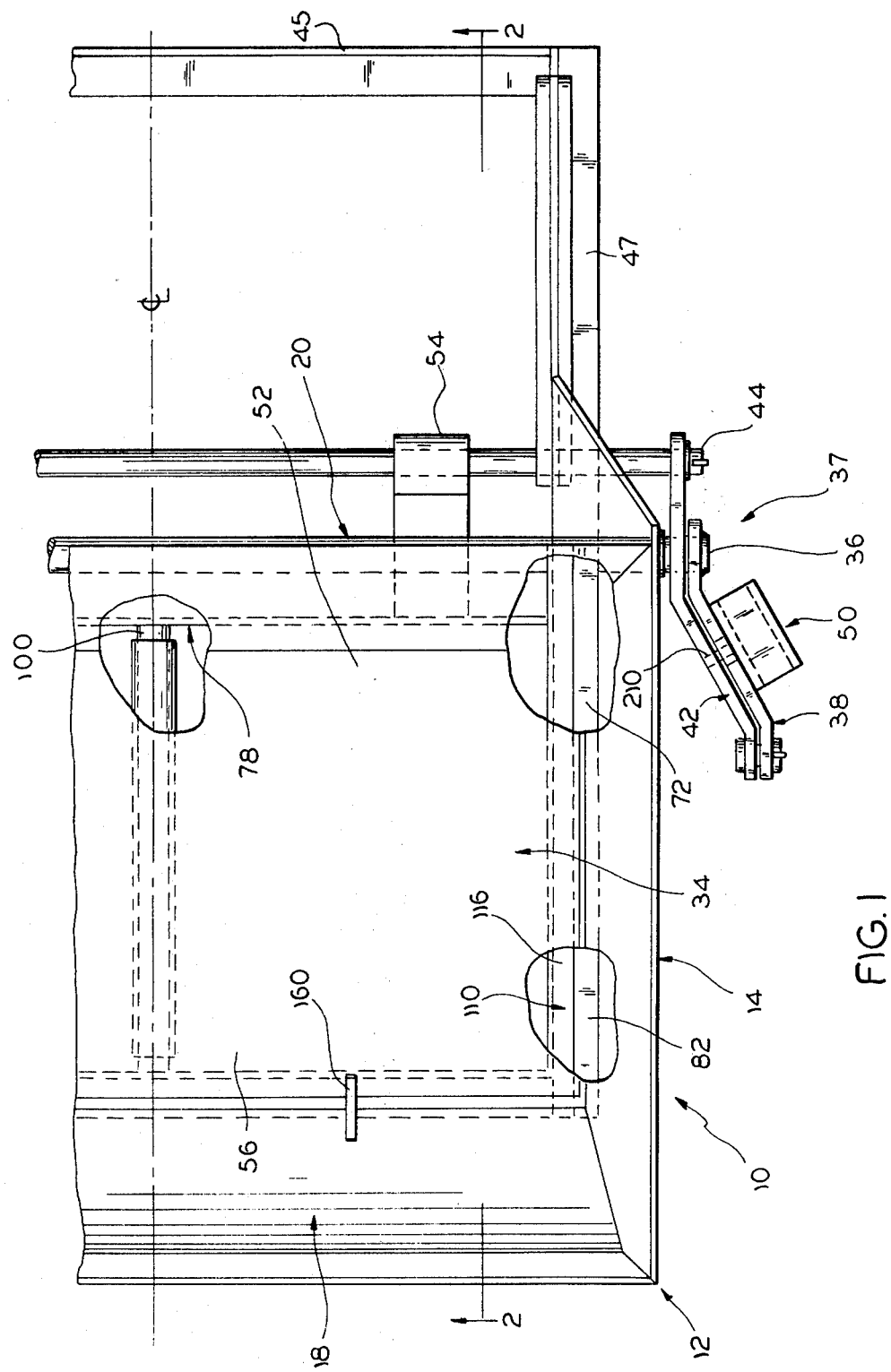
FIG. 1 is a fragmental top plan view of an outlet gate assembly arranged in accordance with the invention, with parts being broken away to expose other parts.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

Reference numeral 10 of the drawings generally indicates one embodiment of the invention which comprises a main frame 12 formed by a pair of longitudinal frame members 14 and 16 joined together with a pair of transverse frame members 18 and 20 to define a hopper outlet opening 22. As indicated in FIGS. 2 and 3, the frame 12 is attached to the lower edges of the hopper car sheets 24, 26, 28 and 30 that define a railroad car hopper 32, the members 14, 16, 18 and 20 being formed to provide continuations of the respective hopper car sheets 24, 26, 28 and 30 that converge in the direction of the outlet opening 22 and form the hopper funneling portion 33 therefor.

Slidably mounted in the frame 12 is outlet gate 34 that, for illustrative purposes, is shown to be operated by the quick opening gate actuation mechanism generally indicated by reference numeral 37 which is that disclosed in Chierici U.S. Pat. No. 3,635,170 (the disclosure of which is hereby incorporated herein by this reference). Gate 34 is mounted for sliding movement between its open and closed positions on slideway 39 arranged in accordance with the present invention, and in the illustrated arrangement, the operating shaft 36, which is journaled between the longitudinal frame members 14 and 16, is effective to move the gate 34 between its open and closed positions by a pair of crank arms or levers 38 and 40 (see FIG. 2) fixed to either end of the shaft 36, which levers 38 and 40 are respectively pivotally connected to a pair of thrust arms 42 and 43 that are in turn pivotally connected to the opposed ends of a slide bar 44 that is slidably mounted in opposed slots 46 and 48 formed in the respective frame members 14 and 16 in projecting portions 47 and 49 thereof (which are joined together by angle member 45 welded therebetween. Each crank arm 38 and 40 has fixed thereto a socket structure 50 adapted to receive one end of the familiar operator's lever bar that is conventionally employed to operate outlet gates of railroad hopper cars.

For illustrative purposes, the gate 34 is shown as having its rear end 52 connected to slide bar 44 by connecting structures 54, and the opposite end 56 of the gate forms the forward end of the gate that is moved across the outlet opening or port 22 to open the hopper.

However, the specific date actuation provided in any specific embodiment of the invention is optional; for instance, gear and rack gate actuation arrangements of any conventional type would also be suitable.

In accordance with the present invention, the assembly funneling portion 33 is equipped with a supplemental frame 70 that defines the basic configuration of the outlet port or opening 22 and forms the support and slidable mounting arrangement of the gate 34 that includes the slideway 39.

The supplemental frame 70 comprises a pair of longitudinal frame members 72 and 74 of channel shaped transverse cross-sectional configuration fixed as by welding to the lower edges of the respective longitudinal frame members 14 and 16, and a pair of transverse frame members 76 and 78 between which the respective members 72 and 74 extend, with the members 72 and 74 at their ends being suitably fixed, as by employing welding, to the respective members 76 and 78 to define the quadrilateral shape of the outlet opening or port 22 that is indicated. The frame member 76 is shown as being of modified channel shaped transverse cross-sectional configuration while the frame member 78 is of "Z" configuration.

The frame members 72 and 74 each define a web 80 and side flanges 82 and 84, with the side flanges 82 being fixed to the respective members 14 and 16, as by welding at 85.

The frame member 76 defines web 86 and side flanges 88 and 90, with the side flange 88 being welded to transverse member 18, as and where indicated at 91.

The frame member 78 comprises a web 92 and oppositely extending side flanges 94 and 96, with the side flange 96 being disposed below the transverse member 20 to define gate opening 98 through which the gate extends for movement between its open and closed positions.

The supplemental frame 70 across the mid portion of the outlet opening or port 22 includes longitudinally extending frame member 100 that parallels the members 72 and 74, and is fixed at its ends, as by welding, to the webs 86 and 92 of the respective frame members 76 and 78.

The frame members 72, 74 and 100 define upwardly facing load support surfaces 102, 104 and 106, respectively, which in accordance with the invention are equipped with liners 110, 112 and 114, respectively.

In accordance with the invention, the liners 110, 112 and 114 are formed from ultra high molecular weight (UHMW) polyethylene having a molecular weight in the range of from about 3 to about 9 million. In the preferred embodiment, the liners are made from the molecularly oriented UHMW polyethylene marketed by Ketrol Enterprises (of York, Pennsylvania) under the trademark TUFLAR (grade PL). This material is shaped to define the respective liners 110, 112 and 114 and conforms to the characteristics specified in this application, and thus, among other aspects in addition to being of dry self-lubricating nature, is pliable but non-stretchable and is sufficiently compact resistant to resist any substantial compaction under compressive forces up to its elastic limit, while having a high degree of elastic memory for full return to original shape after being stressed, up to its elastic limit. Further, the material specified is characterized by its surfacing being resistant to adherence thereto of foreign material, including bulk materials encountered in the use of railroad hopper cars, such as potash.

The liners 110 and 112 in the form illustrated are of right angle transverse cross-sectional configuration defining right angled flange portions 116 and 118 of which a flange portions 116 are applied to the respective load support surfaces 102 and 104 of the respective members 72 and 74, with the flanges 118 being disposed in depending relation against the respective webs 80 of the members 72 for securement thereto by suitable fastening devices indicated at 120, such as rivets, nut and bolt assemblies, or the like.

The liner flange portions 116 define upwardly facing slide surfaces 122 on which the undersurface 124 of the gate 34 rides at its side edges 55 and 57.

The liners 110 and 112 extend the full length of the respective frame members 72 and 74, as indicated in FIGS. 1 and 2.

The liner 114 is of tubular configuration, it comprising a sleeve 130 of quadrilateral transverse cross-sectional configuration defining upper planar wall 132, lower planar wall 134 and vertical side walls 136 and 138. Sleeve 130, in accordance with the illustrated embodiment of the invention, defines bore 140 which is proportioned to have a substantially complementary but loose fit with the frame member 100, which in the illustrated form is shown to be also tubular in nature and to be of quadrlateral transverse cross-sectional configuration of the shape complementing that of the sleeve 130.

As indicated in FIGS. 2 and 4, the sleeve 130 is proportioned lengthwise of same to have its ends 142 and 144 extend well short of frame members 76 and 78.

It is a feature of this invention that the sleeve 130 be slidably mounted on frame member 100 whereby the sleeve 130 has limited lost motion movement relative to the gate 34 and the frame 12, to provide the breakaway action described hereinafter in connection with the operation of the gate assembly 10.

As indicated more specifically in FIG. 6, the liners 110 and 112 at their portions 116 define planar upwardly facing slide surfaces 122 on which the undersurface 124 of the gate rides at its respective side edges 55 and 57. The sleeve 130, and specifically its top side or wall 132, defines slide surface 123 on which the gate undersurface 124 also rides across the mid portion of the gate. The liners 110, 112 and 114 are disposed such that their slide surfaces 122 and 123 are in substantially coplanar horizontal relation in defining the slideway 39 for gate 34.

Further, as will be seen hereinafter in connection with the description of operation of the gate assembly 10, the liner 114 defines two slip surfaces in connection with its cooperation with frame member 110 and the gate 34. One slip surface is surface 158 on the underside of the sleeve top wall 130 which rides on the load supporting surface 106 of the frame member 100, and the other slip surface is the sleeve slide surface 123 that engages the underside 124, and specifically its undersurfacing 125.

As indicated in FIGS. 1, 2 and 3, the frame member 18 has affixed thereto on either side of the frame member 100 a gate engaging lug 160, with the lugs 160 being disposed elevationally so that their undersurfaces 162 slidably receive the front inner edge 53 of the gate with some downward bias whereby the front end 56 of the gate is pressed against the top side of the flange 88 of frame member 86 for effecting sealing of the gate across its front edge 56. The lugs 160 in the embodiment illustrated are two in number and are formed from steel or the like shaped to have smoothly curved protuberant ends 164 for camming engagement with the front edge 53 of the gate as the gate moves toward its fully closed position.

As indicated, the liners 110, 112 and 114 are preferably formed from the indicated ultra high molecular weight polyethylene material, whereby the liner surfacings 122 and 123 that are defined thereby are characterized by resistance to adherence thereto of foreign matter, while being self lubricating in nature and providing a coefficient of sliding or dynamic friction relative to the metal components involved on the order of 0.02.

The material in question, in addition to being high strength wear resisting material, also is characterized by effecting on the surfaces moving relative to it a polishing or honing resurfacing action such that after a period of normal use, the metal surfacing involved takes on a mirror like finish whereby the cooperating metallic surface involved becomes effectively resistant against further wear. Any foreign material that becomes caught between the two surfaces involved seems to become embedded in the liner surfacing and thus is in a position to avoid any wearing action on the metallic surfaces involved. As indicated, since the material from which the liner is made resists adherence thereto of foreign matter, such foreign matter does not accumulate on the liner and it is only grit and the like that becomes trapped between the surfaces that is subjected to the embedding action indicated.

The gate 34 is moved to its closed position shown in FIGS. 1 and 2 utilizing the gate actuation mechanism employed for a particular assembly 10; in the form shown, the familiar operator's level bar is applied to socket structure 50 and swung in the appropriate direction, following the disclosure of said U.S. Pat. No. 3,635,170, whereby slide bar 44 is moved to the left of FIGS. 1 and 2 to dispose the gate 34 in its closed position.

As indicated in my said patent, the crank arms 38 and 40 are equipped with an upstanding lug 206 that is slotted as at 208 to receive a conventional sealing ribbon that is also applied to a slot 210 formed in the respective thrust members 42 and 43. In the closed position of the gate 34, the slots 208 and 210 are aligned for application of the sealing ribbon thereto, and preferably the crank arm and thrust member on both sides of the car are similarly equipped to receive such sealing ribbons. Where other gate actuation mechanisms are employed in practicing the invention, the gate may be sealed in any suitable manner.

As indicated in FIGS. 2 and 4, the gate at its rear end 52 is provided with a seal 170 in the form of an elongate strip 171 of elastomeric material that extends the length of the gate opening 98 for sealing same across the top of the gate, by engagement with the exterior surfacing 173 of frame member 20, when the gate is in its closed position. The seal strip 171 is backed up by angle member 172 suitably fixed to the gate and having an upstanding flange 174 against which the seal strip 171 is seated when the gate is in its closed position such that the seal strip 171 bears against the frame member 120. The seal strip 171 may be formed from a suitable elastomeric material, such as polyurethane, and suitably bonded to the gate or otherwise affixed thereto.

The gate 34 along its side edges 55 and 57 is also sealed by the weight of the lading bearing on the gate. The weight of the lading bearing against the gate side edges 55 and 57 compresses the gate side edges 55 and 57 against the liner surfaces 122, with the result that the liner portions 116 deflect somewhat, within the elastic limit of the material employed, to provide continuous contact of the gate undersurfacing 125 with the respective surfaces 122 for effecting a full seal therealong. Since the material from which the liners 110, 112 and 114 is made is resistant to adherence thereto of foreign matter, including the bulk materials normally encountered in rail transit, the movement of the gate to its closed position wipes the surfaces 122 substantially clean and any grit or the like remaining that is trapped between the gate and respective liner portions involved is pressed into embedded relation in the liner portions 122 for the full depth of the grit or the like involved, whereby such foreign matter is disposed to have no adverse effect on the seal provided along the side edges of the gate. Further, this embedding of foreign material in the liner portions 116 tends to enlarge the thickness of the liner portions 116 to provide a self compensating effect for making up for such wear or attentuation as there is on the liner surfaces 122 due, for instance, to the aforementioned resurfacing of the gate undersurface that is involved.

The material from which the liners 110, 112 and 114 is formed in corrosion resistant, and in the resurfacing of the gate undersurface areas engaged thereby, not only resurfaces such areas, but protects these portions of the gate from corrosion and insures low coefficient of friction characteristics that make for easy operation of the gate in use.

Frame member 78 has angle member 170 affixed thereto, as by welding, defining support flange 172 for application of a conventional cover or boot (not shown) that is held in place by employing conventional boot clips (not shown) to side flanges 84 and 90 of frame members 72, 74 and 76.

The gate 34 in being moved to its closed position in the empty load condition slides along sleeve 130, and since sleeve 130 is free to move relative to frame member 100, at slip surface 158, movement of the sleeve 130 to the left of FIGS. 1 and 2 is effected by reason of the sliding of the gate underside surface 125 on the sleeve top surface 132. This spaces the end 144 of the sleeve 130 from the web 92 of frame member 78, as indicated in FIG. 4. The gate 34 in its fully closed position traps the end 142 of the sleeve 130 between it and the frame member 100, due to the downward biasing action applied to the gate front end 56 by lugs 160.

Assuming that the hopper 32 is loaded and the gate is to be opened, after the gate locking seals and the conventional boot are removed, the indicated operator's lever bar is applied to the socket 50 and the operating shaft 36 is operated to initiate opening movement of the gate, by swinging or pivoting the shaft 36 clockwise of FIG. 2 to articulate the crank arms in the manner described in said patent, where this type of gate actuation mechanism is employed.

The weight of the lading bearing against the gate 34 subjects the gate and liners 110, 112 and 114 to substantial compressive stress. And, of course, the front end 56 of the gate is pressed against the frame member and the rear end 52 of same is pressed against frame member 78; lugs 160 as part of the gate closing action trap the end 142 of sleeve 130 (liner 114) in compressed relation between the gate underside 124 and frame member 100. As the gate movement is initiated, the gate slides to the right of FIGS. 1 and 2 relative to liners 110 and 112, but liner 114 moves with the gate, with the liner 114 moving to the right relative to the frame member 100. When the gate movement reaches the point where the end 144 engages frame member 78 and specifically its web 92, movement of the liner 114 ceases and the static friction between the surface 158 of liner 114 and the gate undersurfaces is broken due to the breakaway action involved, whereby the gate now moves freely to the right relative to the liner 114.

In the fully open position of the gate 34, the crank arms 38 and 40 are swung approximately 180 degrees to approximately the horizontal position indicated in said patent, in which position the front end 56 of the gate is disposed under the frame transverse member 20.

Return of the gate to its closed position effects the repositioning of the parts involved to provide for the next opening operation of the gate.

The arrangement for operating the gate that is disclosed is provided for illustrative purposes only, as any suitable provision may be made for effecting movement of the gate between its open and closed positions. The prior art is replete with examples of rack and gear type arrangements, powered either by air or using suitable hand levers, that may be used. The present invention is not concerned with any specific way of effecting movement of the gate to open and close same.

It will therefore be seen that the invention provides a hopper outlet assembly of few and simple parts in which the gate is mounted for ready operation between its open and closed positions, with provision being made to provide the gate with a breakaway action on initially opening same when the hopper is loaded to facilitate opening under loaded conditions. The liners at the side edge of the gate serve the dual function of providing both the slideway and the seal.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In a hopper outlet gate assembly for railroad hopper cars in which the car hopper has a discharge opening, with the assembly including a frame having four planar sheets in downwardly converging relation and forming a funneling portion terminating in an outlet port, a gate for closing the port, a slideway for the gate, which slideway extends sidewise and across the outlet port, and means for moving the gate longitudinally of the slideway between a first position in which it is disposed across the port to close same and a second position in which it is disposed to one side of the port and away from overlapping with the port to render the port fully open, the improvement wherein:
said slideway comprises:
a pair of spaced apart parallel elongate side trackway members positioned at either side of the gate to support same,
and a third trackway member positioned across the outlet port intermediate said side trackway members,
said trackway members extending longitudinally of said slideway,
said side trackway members each having a liner extending therealong and interposed between the gate underside and the respective said trackway member on which the gate rides,
said third trackway member carrying a liner mounted on same for limited lost motion movement longitudinally of same on which the gate rides,
said liners being formed from a material of dry self lubricating characteristics,
and stop means for limiting said lost motion movement of said third trackway member liner in the outlet port opening movement direction of the gate, whereby when the hopper is loaded and the gate is moved in said direction by said moving means, said third trackway member liner has lost motion movement in said direction with said gate that is stopped by said stop means to overcome static friction between the gate and said third trackway liner for effecting sliding movement of the gate in said direction relative to said third trackway liner with further gate movement under said moving means in said direction to its outlet port open position.

2. The improvement set forth in claim 1 wherein:

said material is an ultra high molecular weight polymer characterized by a high degree of elastic memory and having surfacing that resists adherence thereto of foreign matter.

3. The improvement set forth in claim 2 wherein:

said liners of said pair of trackway members effecting a sealing action engagement therealong with the gate underside when the gate is in its first position and the hopper is loaded.

4. The improvement set forth in claim 1 wherein:

said third trackway member liner is tubular in configuration and defines a bore in which said third trackway member is slidably received for said lost motion movement.

5. The improvement set forth in claim 1 wherein:

said liners each define substantially planar upwardly facing bearing surfaces that are rectilinear lengthwise of the respective liners against which the gate underside engages, said funneling portion including means for camming the gate against the third trackway member liner for trapping same between the gate and said third trackway member in the gate first position.

6. The improvement set forth in claim 5 wherein:

said liner surfaces of said pair of trackway members effecting a sealing action engagement therealong with the gate underside when the gate is in its first position and the hopper is loaded.

7. The improvement set forth in claim 5 wherein:

said gate on its upper side has mounted on same a seal for sealing engagement with the exterior of the assembly funneling portion when the gate is in its first position.

8. In a hopper outlet gate assembly for bulk material carrying railroad hopper cars in which the car hopper has a discharge opening, with the assembly including a frame having four planar sheets in downwardly converging relation and forming a funneling portion terminating in an outlet port of quadrilateral configuration, a gate for closing the port, a slideway for the gate, which slideway extends sidewise and across the outlet port, and means for moving the gate longitudinally of the slideway between a closed position in which the gate is disposed across the port to close same and a second position in which it is disposed to one side of the port and away from overlapping with the port to render the port fully open for discharge of the bulk materials therefrom, with the gate being of such quadrilateral outline that will close the port in said closed position of same and defining opposed front and rear edges and opposed side edges extending normally of said front and rear edges thereof, and the slideway being oriented relative to the outlet port such that two of the opposed sides of the port are parallel to the slideway, and with the gate front edge in the gate closed position being adjacent a third side of the port, the improvement wherein:

said slideway comprises:

a pair of spaced apart parallel elongate side trackway members positioned at either side of the gate and along the sides of the outlet port that parallel the slideway to support the gate, and a third trackway member positioned across the outlet port intermediate said side trackway members, said trackway members extending longitudinally of said slideway, and each of said members defining an upwardly directed load support surface, said side trackway member surfaces each having a liner extending therealong and interposed between the gate underside and the respective side trackway member on which the gate rides, said third trackway member carrying a liner mounted on same for limited lost motion movement longitudinally of same on which the gate rides, and overlying said surface thereof, said liners being formed from an ultra high molecular weight polymer of dry self lubricating characteristics characterized by a high degree of elastic memory and having surfacing that resists adherence thereto of foreign matter, and stop means for limiting said lost motion movement of said third trackway member liner in the outlet port opening movement direction of the gate, whereby when the hopper is loaded and the gate is moved in said direction by said moving means, said third trackway liner has lost motion movement in said direction with said gate that is stopped by said stop means to overcome static friction between the gate and said third trackway liner for effecting sliding movement of the gate in said direction relative to said third trackway liner with further gate movement under said moving means in said direction its outlet port open position, said liners of said pair of trackway members effecting a sealing engagement therealong with the gate underside when the gate is in its closed position and the hopper is loaded.

9. The improvement set forth in claim 8 wherein:

said third trackway member liner is of tubular configuration and has a substantially complemental fit over said third trackway member.

10. The improvement set forth in claim 9 wherein:

said third trackway member and liner therefor are of quadrilateral transverse cross section configuration.

11. The improvement set forth in claim 8 wherein:

the assembly at said third side of the port includes spaced hold down lugs fixed thereto at a level for frictional engagement with the top side of the gate at said front edge thereof, said lugs being disposed relative to the gate for biasing the front edge of same compressively against the respective liners.

12. The improvement set forth in claim 11 wherein:

said gate on its upper side has mounted on same adjacent its rear edge a seal for bulk material sealing engagement with the exterior of the assembly funneling when said gate is in its closed position, said gate front edge being in bulk material sealing relation with said first mentioned frame member when the gate is in its closed position.

13. The improvement set forth in claim 8 wherein said assembly includes:

a frame member forming said third side of the outlet port, and a second frame member underlying the fourth side of the port and being disposed at the level of said first mentioned frame member, said third trackway member being fixed between said frame members, said second frame member comprising said stop means.

14. The improvement set forth in claim 8 wherein:

said pair of side trackway members define said two sides of the port and are formed to present elongate corner portions at the port one side of which defines the respective side trackway member surfaces, said liners for said side trackway member being of angled configuration having one portion overlying the respective side trackway member surfaces and a second depending portion made fast to the respective side trackway members.

* * * * *